US010750678B2

(12) United States Patent
Marques (10) Patent No.: US 10,750,678 B2
(45) Date of Patent: Aug. 25, 2020

(54) SYSTEM FOR PROTECTING PLANT SEEDLINGS

(71) Applicant: OENOPROTECH, Beaune (FR)

(72) Inventor: Antonio Marques, Beaune (FR)

(73) Assignee: OENOPROTECH, Beaune (FR)

( * ) Notice: Subject to any disclaimer, the term of this patent is extended or adjusted under 35 U.S.C. 154(b) by 128 days.

(21) Appl. No.: 15/561,089

(22) PCT Filed: Mar. 22, 2016

(86) PCT No.: PCT/FR2016/050629
§ 371 (c)(1),
(2) Date: Sep. 25, 2017

(87) PCT Pub. No.: WO2016/151235
PCT Pub. Date: Sep. 26, 2016

(65) Prior Publication Data
US 2018/0054980 A1 Mar. 1, 2018

(30) Foreign Application Priority Data
Mar. 23, 2015 (FR) ...................................... 15 52373

(51) Int. Cl.
*A01G 13/02* (2006.01)
*A01G 25/06* (2006.01)
(52) U.S. Cl.
CPC ..... *A01G 13/0206* (2013.01); *A01G 13/0243* (2013.01); *A01G 25/06* (2013.01)
(58) Field of Classification Search
CPC ............ A01G 13/0206; A01G 13/0212; A01G 13/0231; A01G 13/0243
(Continued)

(56) References Cited

U.S. PATENT DOCUMENTS

| 7,523,584 | B2 * | 4/2009 | Voehringer | ........ A01G 13/0206 47/29.1 |
| D595,865 | S  * | 7/2009 | Magnusson | .................... D25/56 |

(Continued)

FOREIGN PATENT DOCUMENTS

| CH | 705 499 A2 | 3/2013 | |
| CH | 705499 A2 * | 3/2013 | ............. A01G 13/04 |

(Continued)

OTHER PUBLICATIONS

Jun. 6, 2016 Search Report issued in International Patent Application No. PCT/FR2016/050629.

*Primary Examiner* — Monica L Barlow
*Assistant Examiner* — Aaron M Rodziwicz
(74) *Attorney, Agent, or Firm* — Oliff PLC (57) ABSTRACT

A system for protecting from bad weather plants seedlings arranged in rows, wherein the system includes: at least one body configured to be positioned nearby at least one row of plants seedlings; at least one first protection member configured to be deployed above the plants seedlings in at least one first position so as to cover at least partially the plants seedlings of the row and to be retracted in at least one second position so as to uncover the plants seedlings of the row, the first protection member being fastened to said body; and at least one control device configured to enable the deployment and retraction of the first protection member, the body including at least one first receiving chamber extending at least partially at a first longitudinal side of said body, the first receiving chamber configured to receive the at least one protection member in the retracted position.

31 Claims, 8 Drawing Sheets

(58) Field of Classification Search
USPC .................................................. 47/21.1, 22.1
See application file for complete search history.

(56) References Cited

U.S. PATENT DOCUMENTS

| | | | |
|---|---|---|---|
| 8,201,359 B1* | 6/2012 | Bryan, Jr. ............ | A01G 13/043 47/20.1 |
| 9,763,392 B2* | 9/2017 | Luciano, Jr. ......... | A01G 13/065 |
| 2008/0148631 A1* | 6/2008 | Wan ................... | A01G 13/0206 47/22.1 |
| 2009/0107038 A1* | 4/2009 | Wan ........................ | A01G 2/00 47/22.1 |
| 2009/0277081 A1* | 11/2009 | Georges ............. | A01G 13/0243 47/6 |
| 2011/0067298 A1* | 3/2011 | Balbas Arroyo .. | A01G 13/0206 47/22.1 |
| 2013/0160357 A1* | 6/2013 | Luciano, Jr. ......... | A01G 13/065 47/2 |
| 2013/0255147 A1* | 10/2013 | Perricone .......... | A01G 13/0206 47/22.1 |
| 2014/0259900 A1* | 9/2014 | Cappi ................. | A01G 13/025 47/22.1 |

FOREIGN PATENT DOCUMENTS

| | | | | |
|---|---|---|---|---|
| JP | S59-101643 U | 7/1984 | | |
| WO | 2014/114966 A1 | 7/2014 | | |
| WO | WO-2014114966 | * | 7/2014 | ............ A01G 13/02 |

* cited by examiner

SYSTEM FOR PROTECTING PLANT SEEDLINGS

FIELD OF THE INVENTION

The invention relates to the technical field of agriculture and more specifically the protection from bad weather, in particular hail, of plants seedlings, for example vine stocks.

BACKGROUND OF THE INVENTION

A known solution to protect plants from hail consists in disposing anti-hail nets above the rows of plants, in a flatbed manner, and preferably covering the entirety of the rows of plants. Depending on the size of the rows, an alternative consists in covering with an anti-hail net the rows of plants in an individual manner. The <<single-row>> net is installed at the sides of each row and vertically, thereby covering the vegetation.

However, these solutions are barely advantageous because they require a heavy infrastructure for the installation, hinder the intervention of the workers and of the machines in the different farming operations and generate greenhouse effects due to the permanent coverage of these nets.

BRIEF SUMMARY OF THE INVENTION

The invention aims to solve all or part of the aforementioned drawbacks.

An object of the invention is a system for protecting from bad weather plants seedlings arranged in rows, the protection system comprising:
at least one body configured to be positioned nearby at least one row of plants seedlings,
at least one first protection member configured to be deployed above the plants seedlings of the row in at least one first position called deployment position so as to cover at least partially the plants seedlings of the row and to be retracted in at least one second position called retraction position so as to uncover the plants seedlings of the row, the first protection member being fastened to said body,
at least one control device configured to enable the deployment and the retraction of the first protection member.

The protection system according to the invention has the advantage of covering and protecting rapidly and momentarily the plants seedlings without generating a greenhouse effect or hindering the different farming operations carried out by the machines or the workers.

According to a feature of the invention, the body comprises at least one first receiving chamber extending at least partially at a first longitudinal side of said body, the first receiving chamber being configured to receive the at least one protection member in the retracted position. Thus, during the retraction of the protection member, the latter completely uncovers the plants seedlings. Preferably, the body is positioned above the plants seedlings.

According to a feature of the invention, the protection system comprises a device for raising the body of said protection system configured so that said body is positioned above the plants seedlings.

According to a feature of the invention, the raising device comprises a height-adjustable support holding the body of the protection system in a stretched position.

According to a feature of the invention, the adjustable support is movable between a folded position and a stretched position. Advantageously, stopping in a position called stretched position is achieved by a mechanical stop arranged on the body.

Advantageously, the raising device may be actuated manually or may be motorized.

According to a feature of the invention, the support is made of aluminum.

According to another feature of the invention, the adjustable support is formed by a spring arranged in a telescopic tube comprising a base on either side. Alternatively, the height-adjustable support is formed by an open profile, in which is housed at least one connecting rod.

According to a feature of the invention, one of the bases is configured to bear on the body and the other base is configured to bear on a stake or a stand on which is positioned the protection system.

According to a feature of the invention, the protection system comprises at least one second protection member arranged on the body opposite the first protection member. Thus, it is possible to cover a plurality of rows of plants seedlings with one single protection system.

According to a feature of the invention, the body comprises at least one second receiving chamber arranged opposite the first receiving chamber and extending at a second longitudinal side of the body.

According to a feature of the invention, the at least one second protection member is positioned in the second receiving chamber.

According to a feature of the invention, the protection system comprises a first plurality of regularly disposed protection members.

According to a feature of the invention, the protection system comprises a second plurality of regularly disposed protection members. The pluralities of protection members allow covering the entire length of the row.

According to a feature of the invention, the body is symmetrical. Advantageously, all the positioning characteristics for one protection member apply to the other protection members.

According to a feature of the invention, the body consists of a profile.

According to a feature of the invention, the body is made of aluminum or of another recyclable material.

According to a feature of the invention, the body is made of a material enabling a deformation allowing matching the straightness irregularities of the rows of plants seedlings.

According to a feature of the invention, the protection member comprises a first end fastened on said body.

According to a feature of the invention, each protection member has a pleated or smooth surface.

According to a feature of the invention, each protection member deploys along the lower surface of the first and second receiving chambers of the body under the effect of their weight.

According to a feature of the invention, each receiving chamber has at least one inclined plane.

According to a feature of the invention, each protection member extends along a direction forming an angle comprised substantially between 25° and 40° with respect to the body. Preferably, each protection member extends along a direction forming an angle comprised between 30° and 35°. Advantageously, each protection member covers a 40 to 50 cm wide perimeter.

According to a feature of the invention, the protection members of one plurality overlap so as to cover the widest possible perimeter of plants seedlings.

According to a feature of the invention, at least one protection member is provided with a hail detection device such as a weather radar, a radio-controlled membrane beacon or the same.

According to a feature of the invention, each protection member is made of a smart textile or of a smart polymer material.

In the present application, it will be meant by smart textile or material a textile or material capable of capturing and analyzing a signal in order to respond thereto in a proper manner using nanotechnologies. In this instance, the material in which is made each protection member is a material capable of hardening or softening depending on the force of the hail or rain impacts and/or capable of storing the heat of the Sun rays and/or having antibacterial properties and/or able to restitute heat at a specific time by Joule effect.

According to a feature of the invention, each protection member is made of a plastic material such as silicone, polytetrafluorethylene, unsaturated polyesters, elastomers.

According to a feature of the invention, each protection member is made of a recyclable material. Advantageously, it is possible to imprint or make a graphic or an ornament on each member, intended for advertising as well as promotion.

According to a feature of the invention, each protection member comprises a perforated surface. Advantageously, the surface of each protection member forms a sieve, which allows the discharge of water and limiting the resistance to heavy rains, wind and hail.

Preferably, the perforations of the surface consist of orifices with a dimension comprised between 5 to 10 mm in diameter.

According to a feature of the invention, each protection member is reinforced with at least one reinforced framework. Preferably, the reinforced framework is metallic and preferably in the form of one or several rod(s).

According to a feature of the invention, the control device of the protection system comprises at least one drive rail configured to enable the deployment and the retraction of the protection members.

According to a feature of the invention, a second end of the protection member is positioned on the drive rail.

According to a feature of the invention, the control device comprises at least one axis cooperating with the drive rail.

According to a feature of the invention, the axis is configured to enable the rotation of the second end of the protection member relative to the drive rail so as to deploy said protection member.

According to a feature of the invention, a torsion spring positioned in the drive rail is configured to complete the deployment of the protection members.

According to a feature of the invention, the drive rail is held in the retraction position by an electromagnet or a tenon.

According to a feature of the invention, the control device comprises at least one deployment reset spring linked to the drive rail.

According to a feature of the invention, the reset spring is positioned around the axis of the control device.

According to a feature of the invention, the control device is configured to simultaneously control each protection member of the first plurality of protection members. According to a feature of the invention, in order to trigger the deployment, only one protection member is equipped with an electronic emitter/receiver. Advantageously, said electronic emitter/receiver communicates with the control device of the protection system so as to deploy or retract the protection members according to data collected from at least one ground detection beacon and/or from at least one bad weather warning station. Alternatively or complementarily, the protection system may be remotely controlled by a user terminal.

According to another feature of the invention, each protection member may be controlled independently of each other.

According to a feature of the invention, the reset may be manual (crank) or automatized (solar battery for example). Advantageously, the manual reset may be performed using a crank via a connection device at the motor end for example.

According to another feature of the invention, the automatized reset achieved using a motor connected to a battery which may be a solar battery for example.

According to a feature of the invention, the reset may be triggered remotely or by means of an atmospheric probe.

According to a feature of the invention, the body comprises an inner housing configured to receive at least partially at least one conduit for treating and/or watering the plants seedlings.

According to a feature of the invention, the protection system comprises at least one fluid transport conduit positioned at least partially in the inner housing of the body.

According to a feature of the invention, at least one atomizing nozzle is connected to the at least one conduit, which allows the nebulization of the plants seedlings.

According to a feature of the invention, the protection system comprises several nozzles. According to a feature of the invention, the nozzles are spaced at regular intervals. According to a feature of the invention, the nozzles are orientated toward the plants seedlings of one row. According to a feature of the invention, the nozzles are positioned under the body.

According to a feature of the invention, each protection system comprises a measuring equipment for biodiversity detection. Advantageously, the measuring equipment is an electro-technical equipment, for example an infrared camera.

According to a feature of the invention, the measuring equipment further comprises at least one outdoor infrared photographic sensor. According to a feature of the invention, the measuring equipment further comprises at least one bacteriological measuring sensor.

According to a feature of the invention, the detection measuring equipment is powered by a battery and a photovoltaic collector.

The detection measuring equipment comprises an emitter/receiver configured to send measurement data to the control device of the protection system or to any other control unit dedicated to receive and process this type of data.

Another object of the invention is a protection set comprising at least two protection systems according to the invention, the body of a first protection system being fastened to the body of a second protection system in a removable manner.

According to a feature of the invention, the protection set comprises a fastening device configured to connect at least mechanically the protection systems to each other.

According to a feature of the invention, the protection set comprises mechanical connectors cooperating with each other by form-fitting, each of said mechanical connectors being formed respectively on one of the protection systems to link.

According to a feature of the invention, each protection system comprises at least one protruding lug on a first end of the body and at least one housing configured to receive by fitting or clipping or nesting a protruding lug of a second protection system.

According to a feature of the invention, the fastening device comprises at least one flexible linking member mechanically linking at least two protection systems of the same protection set to each other. Advantageously, the linking member comprises at least one mechanical connector at each end configured to cooperate by form-fitting with a complementary connector formed on each one of the protection systems to link.

According to a feature of the invention, the flexible linking member is configured to allow fluidly and/or electronically connecting at least two protection systems to each other.

According to a feature of the invention, the flexible linking member has at least one first portion configured to receive a fluid in a sealed manner.

According to a feature of the invention, the first portion of the flexible linking member comprises at least one hydraulic hose, at least one valved hydraulic fitting fastened in a sealed manner directly in the body of the protection system.

According to a feature of the invention, the flexible linking member has at least one second portion configured to receive at least one electronic cable in a sealed manner with respect to the first portion.

According to a feature of the invention, a first electronic cable of a first protection system includes a connector configured to be connected to a complementary connector of a second electronic cable, the first electronic cable being housed in the second portion of the linking member of the protection system.

According to a feature of the invention, the first portion and the second portion of the flexible linking member are positioned in a concentric manner.

According to a feature of the invention, the protection set is fastened on the tuteurs or stakes of plants seedlings or on stands added when the rows of plants seedlings are not equipped with stakes or the same.

According to a feature of the invention, the protection set comprises an anti-lightning device.

Advantageously, the device comprises at least one copper wire and one grounded stake or stand.

BRIEF DESCRIPTION OF THE SEVERAL VIEWS OF THE DRAWINGS

The invention will be better understood, thanks to the description hereinafter, which relates to embodiments according to the present invention, given as non-limiting examples and explained with reference to the appended schematic drawings, in which.

DETAILED DESCRIPTION OF THE INVENTION

Figure 1:
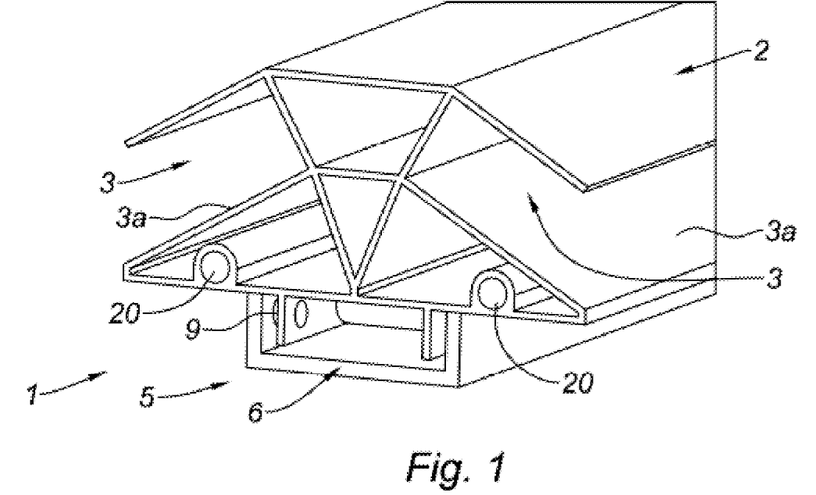
FIG. 1 is a partial perspective view of the protection system according to the invention according to a folded position of the raising device.
Figure 18:
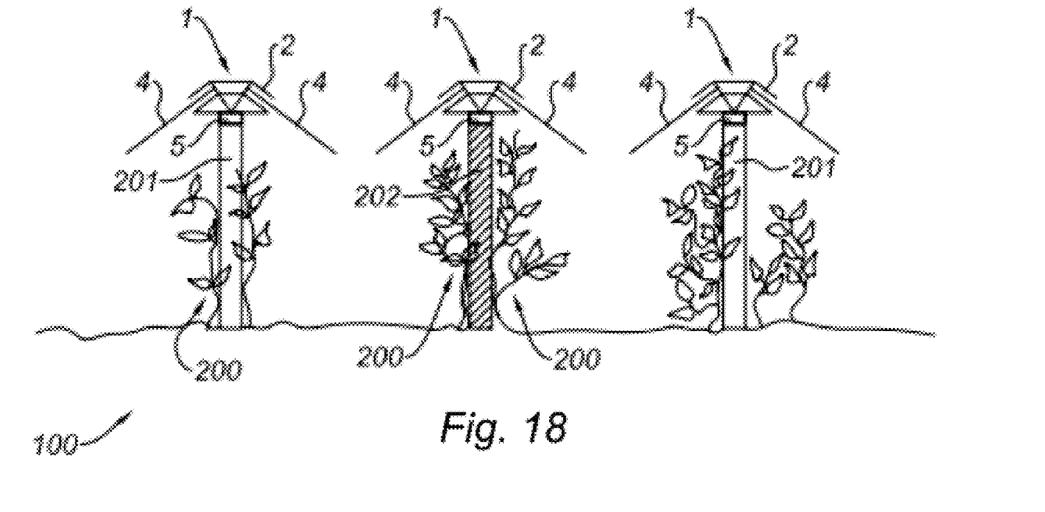

Regardless of the embodiment of the protection members described later on, and as illustrated in FIG. 1, the protection system 1 comprises a body 2 configured to be positioned nearby at least one row of plants seedlings 200. As illustrated in FIG. 18, the body 2 is preferably positioned above the plants seedlings 200. The body 2 comprises at least one first receiving chamber 3 extending at least partially at a first longitudinal side of said body 2, and a second receiving chamber 3 extending at least partially at a second longitudinal side of said body 2.

Figure 2:
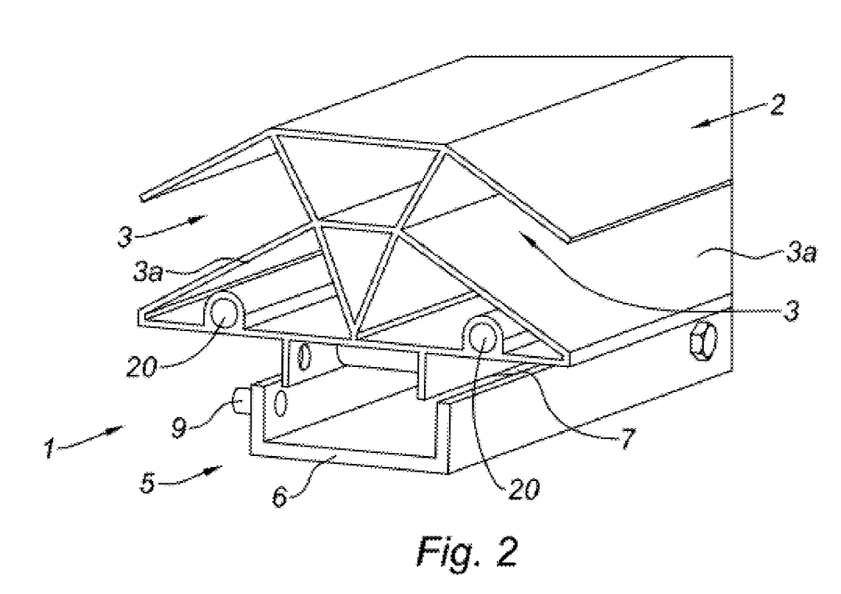
FIG. 2 is a partial perspective view of the protection system according to the invention according to an intermediate position of the raising device.
Figure 3:
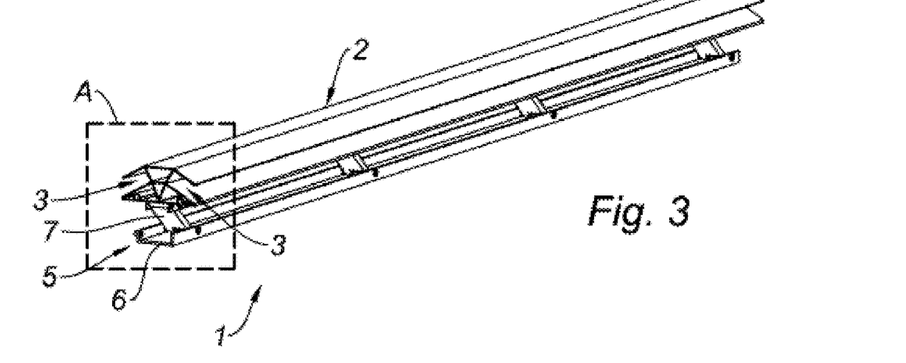
FIG. 3 is a partial perspective view of the protection system according to the invention according to an stretched position of the raising device.
Figure 4:
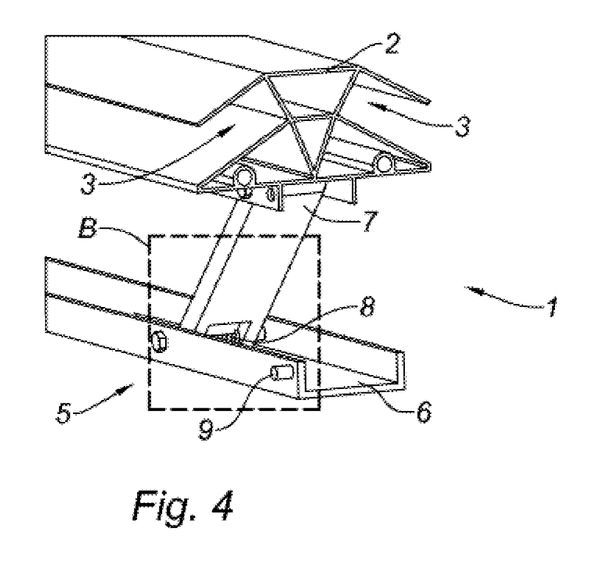
FIG. 4 is a detail view of FIG. 3 according to the detail boundary A.
Figure 5:
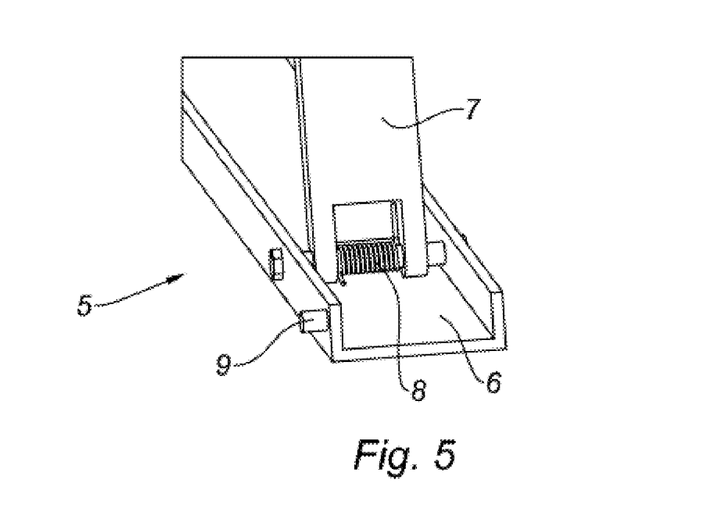
FIG. 5 is a detail view of FIG. 4 according to the detail boundary B.

Regardless of the embodiment of the protection members described later on, and as illustrated in FIGS. 1 to 5, the protection system 1 comprises a device 5 for raising the body 2 configured so that said body 2 is positioned above the plants seedlings 200. The raising device 5 comprises a height-adjustable support 6 holding the body 2 of the protection system 1 in an stretched position above the plants seedlings 200 as represented in FIGS. 3, 4 and 18. In FIG. 1, the raising device 5 is in the folded position. The adjustable support 6 is positioned against the bottom of the body 2. The body 2 is held secured to the adjustable support 6 by means of a tenon or an electromagnet 9. In FIG. 2, the raising device 5 is in an intermediate position between the folded position and the stretched position. In order to pass from the folded position to the stretched position, the tenon or the electromagnet 9 allowing securing the adjustable support 6 with the body 2 must be unlocked so that the raising device 5 could extend. In FIG. 3, the raising device 5 is illustrated in the stretched position. More specifically and as illustrated in FIGS. 4 and 5, the raising device 5 further comprises a connecting rod 7 attached by one end to the body 2 of the protection system 1 and by another end to the adjustable support 6. At the level of the junction of the adjustable support 6 with the connecting rod 7, is positioned a torsion spring 8 enabling the actuation and the return of the raising device 5.

Figure 16:
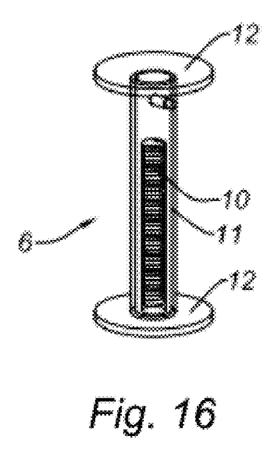
FIGS. 16 and 17 illustrate a variant of the raising device of the protection system according to the invention, FIG. 18 schematically illustrates the set-up of a protection set according to the invention.
Figure 17:
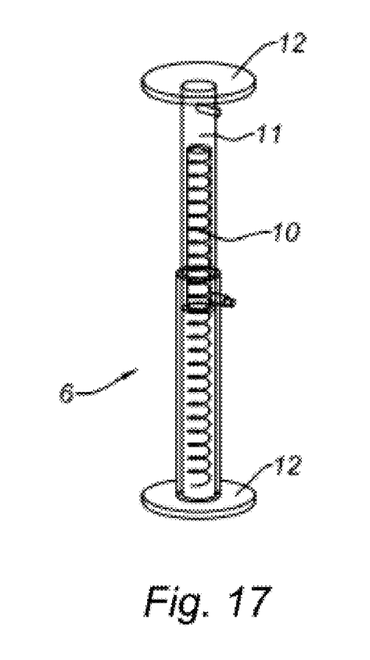

Advantageously, the raising device 5 may be actuated manually or may be motorized. Stopping in said stretched position is achieved by a mechanical stop. Alternatively, and as illustrated in FIGS. 16 and 17, the raising device 5 comprises a spring 10 arranged in a telescopic tube 11 comprising a base 12 on either side. One of the bases 12 is configured to bear on the body and the other base 12 is configured to bear on a stake 201 or a stand 202 on which is positioned the protection system.

According to a first embodiment, the first receiving chamber 3 is configured to receive a first plurality of protection members 4 as described later on and illustrated in particular in FIGS. 9 to 12. The second receiving chamber 3 is configured to receive a second plurality of protection members 4 as described latter on and illustrated in particular in FIGS. 9 to 12.

Figure 6:
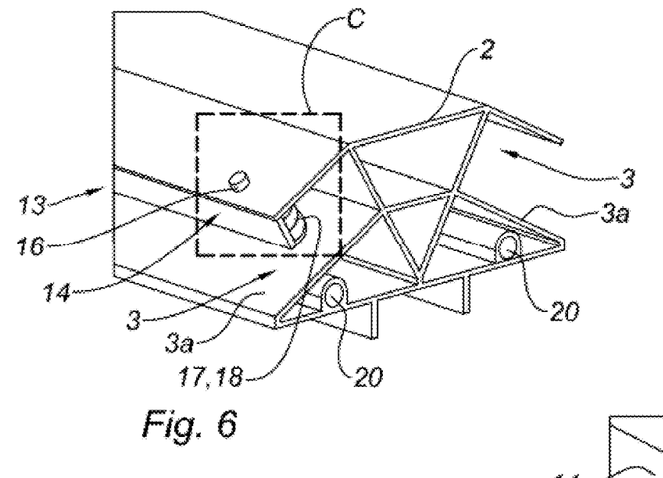
FIG. 6 is a partial perspective view of the protection system according to the invention as represented in FIG. 1, in a retraction position of the protection members.

According to the first embodiment, the first and a second plurality of protection members 4 are housed respectively in the first and the second receiving chamber 3 of the body 2 in a first position called retraction position as illustrated in FIG. 6. Advantageously, in a second position called deployment position, the first and the second plurality of protection members 4 deploy and come out respectively from the first and from the second receiving chamber 3 as illustrated in FIGS. 7, 9 to 12.

For the protection members 4 to deploy, the protection system 1 comprises a control device 13 enabling the passage from the retraction position to the deployment position and vice versa. Each protection member 4 comprises a first end 4a fastened in the body 2.

Figure 10:
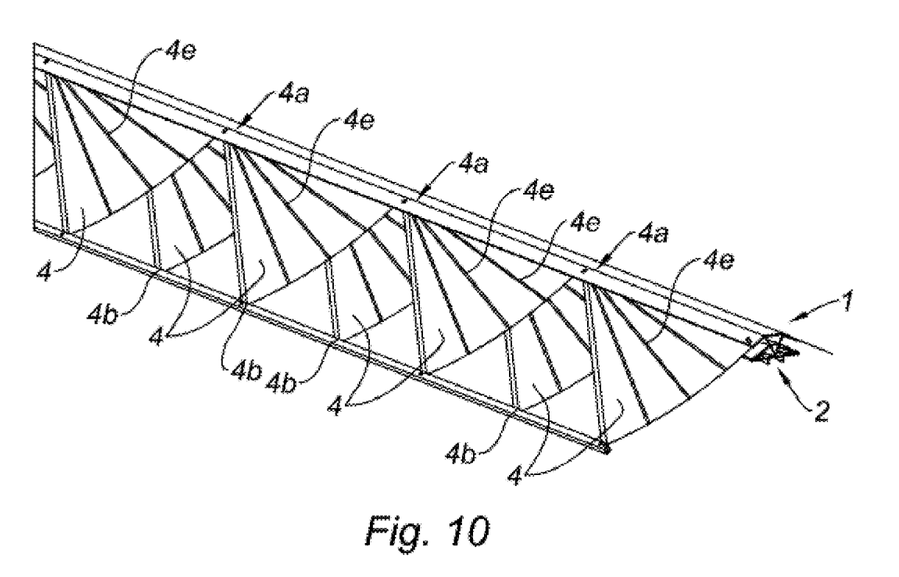
FIG. 10 is a partial perspective view of the protection system according to the invention, in a deployment position of the protection members according to the first embodiment.
Figure 12:
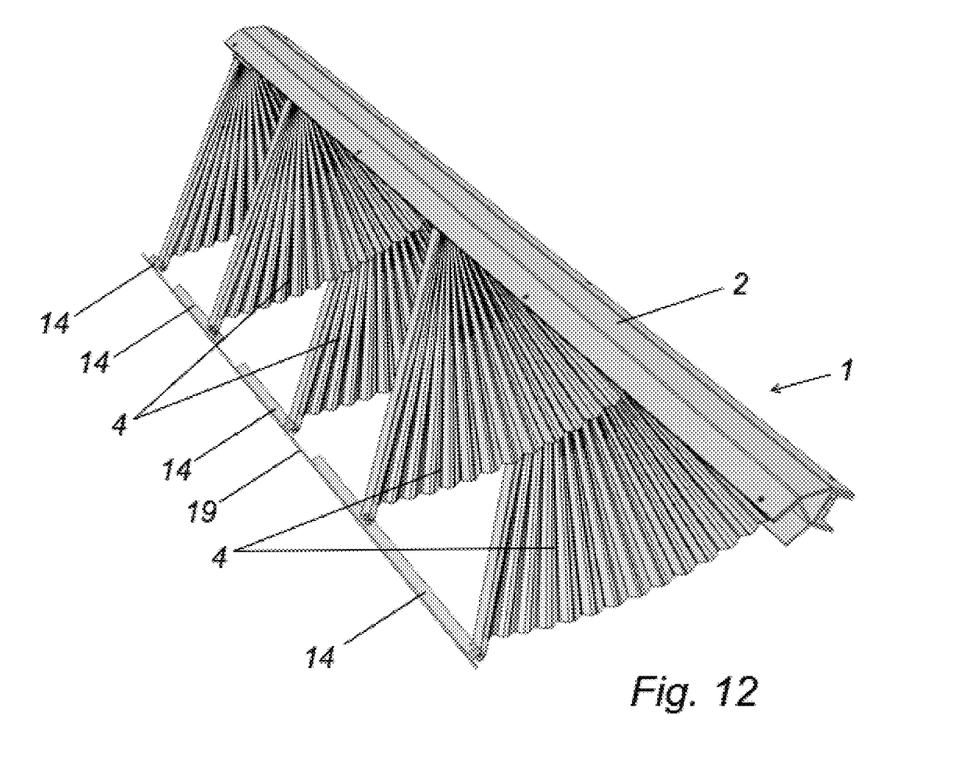
FIG. 12 is a partial perspective view of the protection system according to the invention, in a deployment position of the protection members according to a variant of the first embodiment.

As illustrated in particular in FIGS. 10 and 12, each protection member 4 extends along a direction forming an angle comprised substantially between 25° and 40° with respect to the body 2.

Furthermore, the protection members 4 of one plurality overlap so as to cover the widest possible perimeter of plants seedlings. The protection members 4 are regularly disposed. The protection members 4 deploy along the lower surface 3a of the first and second receiving chambers 3 of the body 2 and a torsion spring 17 positioned in the drive rail 14 enables the completion of the deployment.

Figure 13:
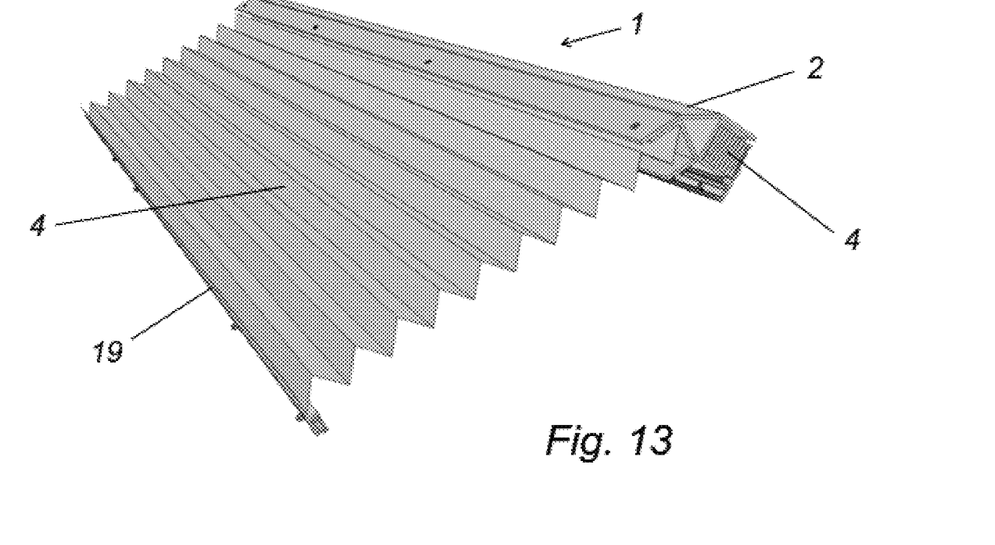
FIG. 13 is a partial top perspective view of the protection system, in a deployment position of the protection members according to a second embodiment according to the invention.

According to a second embodiment represented in FIG. 13, the first receiving chamber 3 is configured to receive a first protection member 4 extending longitudinally along the entire length of the body 2. The second receiving chamber 3 is configured to receive a second protection member 4 extending longitudinally along the entire length of the body 2.

Figure 14:
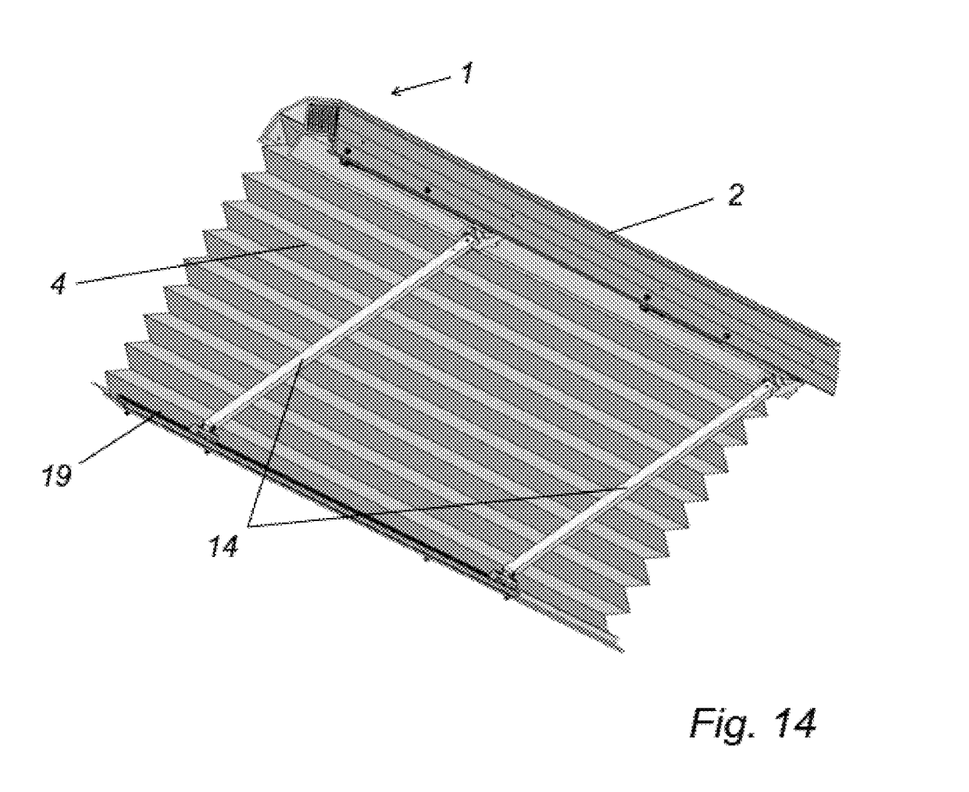
FIG. 14 is a partial bottom perspective view of the protection system represented in FIG. 13.

According to the second embodiment as illustrated in FIGS. 13 and 14, the first and the second protection members 4 are housed respectively in the first and the second receiving chamber 3 of the body 2 in a first position called retraction position as illustrated in FIG. 13. Advantageously, in a second position called deployment position, the first and the second protection members 4 deploy and come out respectively from the first and from the second receiving chamber 3 as illustrated in FIG. 13. For the protection members 4 to deploy, the protection system 1 comprises a control device 13 enabling the passage from the retraction position to the deployment position and vice versa. Each protection member 4 comprises a first end 4a fastened in the body 2 as shown in FIG. 13.

The protection members 4 deploy along the lower surface 3a of the first and second receiving chambers 3 of the body 2 and a torsion spring 17 positioned in the drive rail 14 enables the completion of the deployment.

Figure 9:
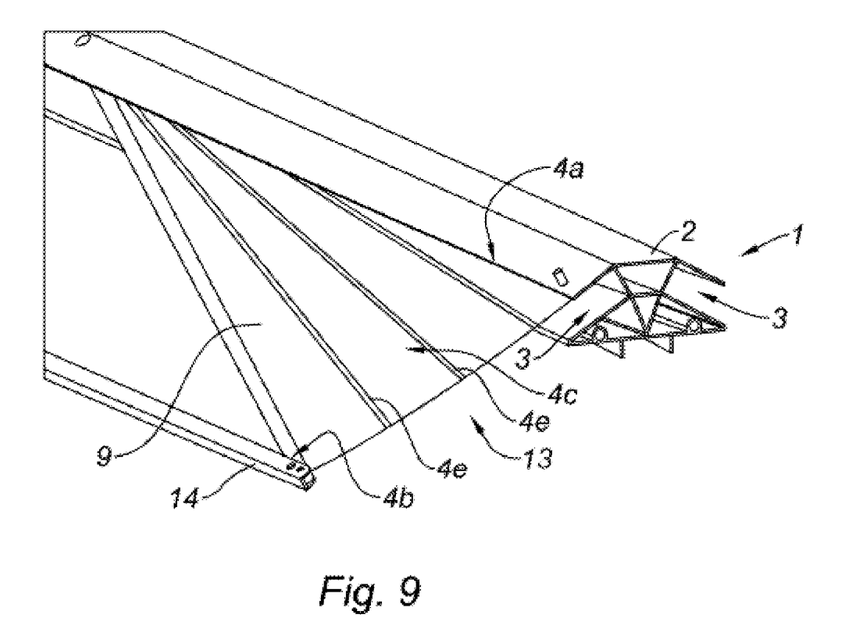
FIG. 9 is a partial perspective view of the protection system according to the invention, in a deployment position of a protection member according to a first embodiment.
Figure 11:
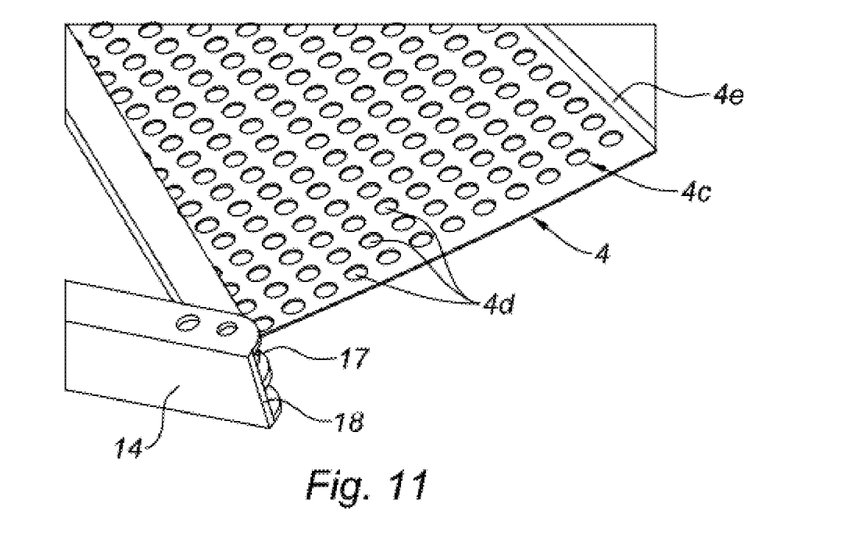
FIG. 11 is a partial detail view of a protection member according to the first embodiment.

According to the first embodiment or the second embodiment and as illustrated in FIG. 11, each protection member 4 has a pleated or smooth surface 4c. In addition, each protection member 4 is made of a smart textile or of a smart material. Furthermore, the surface 4c of each protection member 4 is perforated so as to form a sieve, which allows the discharge of water and limiting the resistance to heavy rains, wind and hail. The perforations 4d of the surface 4c consist of orifices with a dimension comprised between 5 to 10 mm in diameter. As shown in FIGS. 9 and 10, each protection member 4 is reinforced with at least one reinforced framework 4e. The reinforced framework 4e is metallic and preferably in the form of one or several rod(s) 4e.

Regardless of the embodiment of the protection member(s) 4, the control device 13 is illustrated in particular in FIGS. 6 to 8, 12, 13. The control device 13 comprises a drive rail 14 on which is positioned a second end 4b of each protection member 4.

Regardless of the embodiment of the protection member(s) 4, the drive rail 14 is configured to be movable between the retraction position and the deployment position, so that when said drive rail 14 is in the retraction position, the protection members 4 are housed in the first or the second receiving chamber 3 of the body 2 and that when said drive rail 14 is in the deployment position, the protection members 4 deploy in turn.

According to a variant of the first embodiment represented in FIG. 12, the drive rail 14 comprises several independent segments linked by a cover 19.

According to the second embodiment represented in FIG. 14, the drive rail 14 is positioned under the first protection member 4, so as to deploy said protection member 4. Advantageously, and as illustrated in FIG. 14, the protection system comprises two drive rails 14 for each protection member 4.

According to a feature of the invention, the protection system comprises a cover 19 positioned at one end of each protection member 4.

Figure 7:
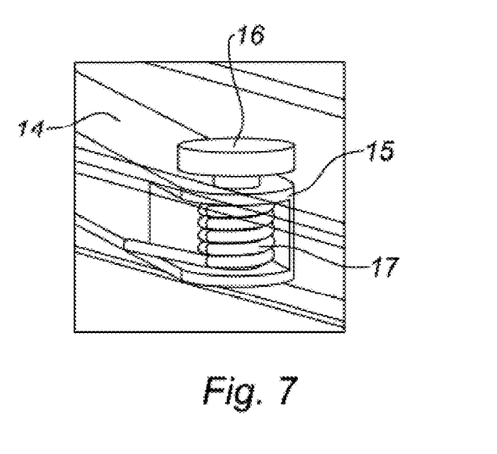
FIG. 7 is a detail view of FIG. 6 according to the detail boundary C.
Figure 8:
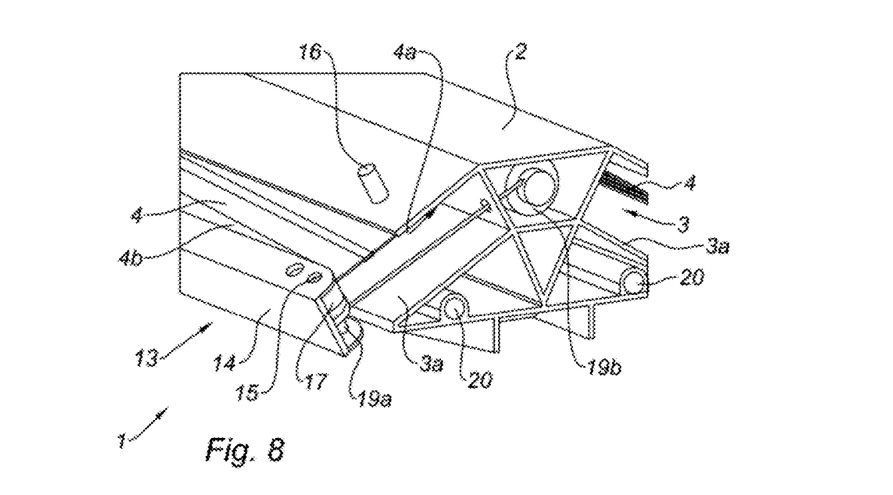
FIG. 8 is a partial perspective view of the protection system according to the invention as represented in FIG. 1, in an intermediate deployment position of the protection members.

According to the first embodiment, and as illustrated in FIGS. 7 and 8, the control device 13 comprises at least one axis 15 cooperating with a drive rail 14. Said axis 15 is configured to enable the rotation of the second end 4b of each protection member 4 relative to the drive rail 14 so as to deploy each protection member 4.

Regardless of the embodiment of the protection members 4, and as illustrated in FIGS. 6 to 8, the drive rail 14 is held in the retraction position by an electromagnet 16 or a tenon 16. When the tenon or the electromagnet 16 is departed from the drive rail 14, the drive rail 14 departs from the body 2 and under the effect of their own weight, the protection members 4 deploy as illustrated in FIGS. 9 and 10. The control device 13 further comprises a spring 18 for disarming the deployment enabling the deployment of the protection members 4. In addition, the protection system comprises a reset device including at least one cable and one motor or one crank, the cable being linked to the motor so as to return the drive rail 14 up to the retraction position in order to retract the protection members 4. Advantageously, in case of failure of the system, the protection members 4 can be linked manually by pressing on the drive rail 14. In a general manner, and regardless of the embodiment of the control device 13, said control device 13 may be motorized or manually actuated by means of a crank for example.

Figure 15:
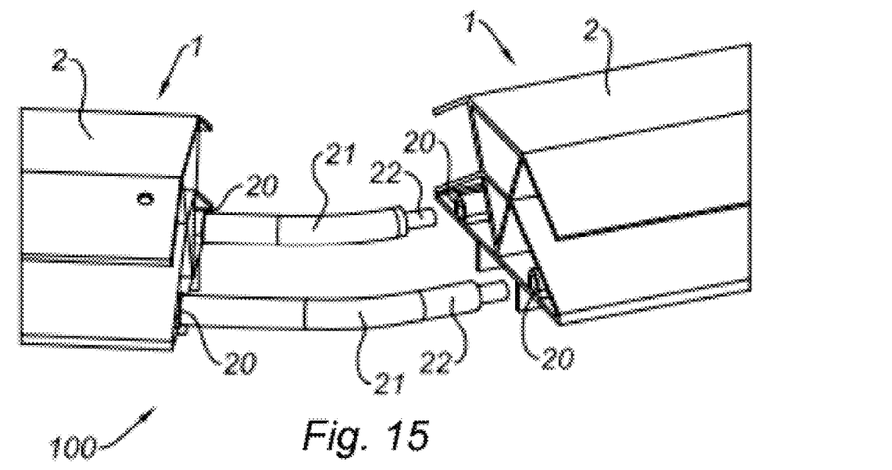
FIG. 15 is a partial view of a protection set and of the fastening device between two protection systems, according to the invention.

As illustrated in FIGS. 15 and 18, another object of the invention is a protection set 100 comprising at least two protection systems 1 according to the invention and regardless of the embodiment of the protection members 4, the body 2 of the first protection system 1 being fastened to the second system 1 in a removable manner.

Regardless of the embodiment of the protection members 4, and as illustrated in FIG. 15, the protection set 100 comprises a fastening device 20, 21, 22.

Regardless of the embodiment of the protection members 4, the fastening device further comprises in the example illustrated in FIG. 15, two flexible linking members 21 configured to mechanically link two protection systems 1 to each other. The flexible linking members 21 are also configured to allow fluidly and/or electronically connecting two protection systems 1 to each other. As regards the mechanical linkage of the protection systems 1, the protection set 100 comprises mechanical connectors 20, 22 cooperating with each other by form-fitting, each of said connectors 20, 22 being formed on one of the protection systems to link.

Figure 19:
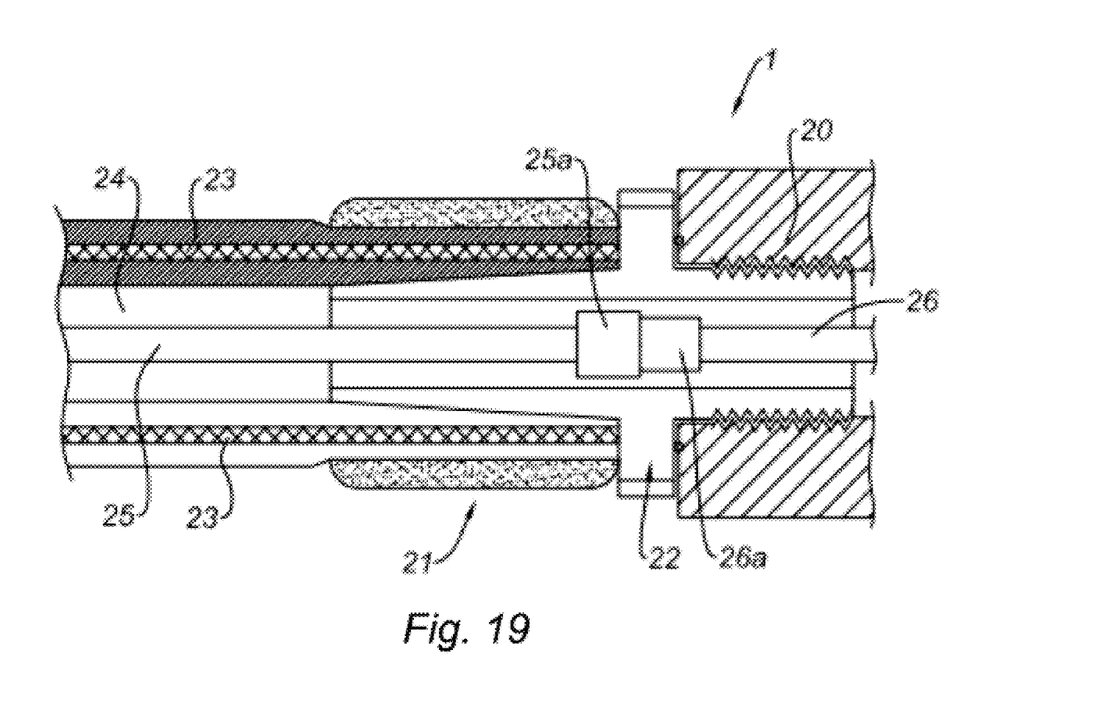
FIG. 19 is a schematic sectional view of a conduit of the protection system according to the invention.

Regardless of the embodiment of the protection members 4, and in a non-represented variant, each protection system 1 comprises at least one protruding lug on a first end of the body 2 and at least one housing configured to receive by fitting or clipping or nesting a protruding lug of a second protection system 1. As regards the fluidic connection, the flexible linking members 21 have at least one first portion 23 configured to receive a fluid in a sealed manner. Advantageously, the first portion 23 of each flexible linking member 21 comprises at least one hydraulic hose, at least one valved hydraulic fitting fastened in a sealed manner directly in the body as illustrated in FIG. 19. Advantageously, sealing is achieved by positioning O-ring gaskets.

Regardless of the embodiment of the protection members 4, at least one atomizing nozzle (not represented) is linked to the at least one first portion 23 of each flexible linking member 21, which allows the nebulization of the plants seedlings 200. As regards the electronic connection, the flexible linking members 21 have at least one second portion 24 configured to receive at least one electronic cable 25.

In the example illustrated in FIG. 19 and regardless of the embodiment of the protection members 4, a first electronic cable 25 of a first protection system 1 is connected by a connector 25a to a complementary connector 26a of a second electronic cable 26 of a second protection system 1. The electronic cables 25, 26 are housed in a portion of the conduit 21.

In the example illustrated in FIG. 19 and regardless of the embodiment of the protection members 4, the connector 25a and the complementary connector 26a consist of sealed circular connectors.

As shown in FIG. 19 and regardless of the embodiment of the protection members 4, the first portion 23 and the second portion 24 of each flexible linking member 21 are positioned in a concentric manner.

As represented in FIG. 18 and regardless of the embodiment of the protection members 4, the protection set 100 is fastened on the tuteurs or stakes 201 of plants seedlings 200 or on stands 202 added when the rows of plants seedlings 200 are not equipped with stakes 201 or the same.

Obviously, the invention is not limited to the embodiment described and represented in the appended figures. Modifications are still possible, in particular with regard to the constitution of the various elements or by substitution of technical equivalents, still without departing from the scope of the invention.

The invention claimed is:

1. A protection system for protecting from bad weather plants seedlings arranged in rows, the protection system comprising:
   at least one body configured to be positioned proximate to at least one row of plants seedlings, the at least one body including at least one first receiving chamber extending at least partially at a first longitudinal side of the at least one body and a second receiving chamber extending at least partially at a second longitudinal side of the at least one body;
   at least one first protection member and at least one second protection member each configured to be (i) deployed above the at least one row of plants seedlings in at least one first position called deployment position so as to cover at least partially the at least one row of plants seedlings and (ii) retracted in at least one second position called retraction position so as to uncover the at least one row of plants seedlings, the first protection member and the second protection member being housed respectively in the first receiving chamber and the second receiving chamber of the body in the retraction position; and
   at least one control device configured to enable the deployment and the retraction of the first protection member, the control device including at least a drive rail on which a second end of each protection member is connected, the first end of each protection member being fastened to the at least one body, and the control device including at least one axis cooperating with the drive rail, the axis being configured to enable rotation of the second end of each protection member relative to the drive rail so as to deploy each protection member.

2. The protection system according to claim 1, wherein the drive rail includes a plurality of independent segments linked by a cover.

3. The protection system according to claim 1, wherein the drive rail is positioned under the first protection member.

4. The protection system according to claim 1, further comprising two drive rails, including the drive rail, corresponding to each protection member.

5. The protection system according to claim 1, further comprising a cover positioned at one end of each protection member.

6. The protection system according to claim 1, wherein the drive rail is held in the retraction position by an electromagnet.

7. The protection system according to claim 1, wherein the drive rail is held in the retraction position by a tenon.

8. The protection system according to claim 1, wherein the protection members deploy due to the respective weight of each protection member.

9. The protection system according to claim 1, further comprising a torsion spring positioned in the drive rail to enable completion of the deployment.

10. The protection system according to claim 1, wherein the control device includes a spring configured to disarm deployment enabling the deployment of the protection members.

11. The protection system according to claim 10, further comprising a reset device including at least one cable and at least one motor, the cable being linked to the motor so as to return the drive rail up to a retraction position in order to retract the protection members.

12. The protection system according to claim 1, wherein each protection member is made of a smart textile.

13. The protection system according to claim 1, wherein a surface of each protection member is perforated so as to form a sieve, which allows discharge of water and limits resistance to heavy rains, wind, and hail.

14. The protection system according to claim 13, wherein the perforations of the surface of each protection member are orifices with a dimension between 5 mm to 10 mm in diameter.

15. The protection system according to claim 1, wherein each protection member is reinforced with at least one reinforced framework.

16. The protection system according to claim 15, wherein the reinforced framework is in the form of one or more rods.

17. The protection system according to claim 1, further comprising a plurality of fastening devices configured to fasten two adjacent bodies in a removable manner.

18. The protection system according to claim 17, further comprising two flexible linking members configured to mechanically link two bodies to each other.

19. The protection system according to claim 18, wherein the two flexible linking members are configured to allow fluidly or electronically connect two bodies to each other.

20. The protection system according to claim 18, wherein the two flexible linking members each have at least one first portion configured to receive a fluid in a sealed manner.

21. The protection system according to claim 20, wherein the first portion of each flexible linking member includes at least one hydraulic hose, at least one valved hydraulic fitting fastened in a sealed manner directly in the body.

22. The protection system according to claim 21, wherein at least one atomizing nozzle is linked to the at least one first portion of each flexible linking member, which allows for nebulization of the plants seedlings.

23. The protection system according to claim 20, wherein the two flexible linking members have at least one second portion configured to receive at least one electronic cable.

24. The protection system according to claim 23, wherein a first electronic cable of a first body is connected by a connector to a complementary connector of a second electronic cable of a second body.

25. The protection system according to claim 23, wherein the first portion and the second portion of each flexible linking member are positioned in a concentric manner.

26. The protection system according to claim 17, wherein each body includes mechanical connectors cooperating with each other by form-fitting.

27. The protection system according to claim 17, wherein each body includes at least one protruding lug on a first end of each body and at least one housing configured to receive, by fitting or clipping or nesting, a protruding lug of a second body.

28. The protection system according to claim 1, further comprising a device for raising the body, the raising device including a height-adjustable support holding the body in a stretched position above the plants seedlings, the height-adjustable support being positioned against a bottom of the body.

29. The protection system according to claim 28, wherein the height-adjustable support includes a connecting rod attached by a first end to the body and by a second end to the adjustable support, and, at a level of a junction of the height-adjustable support with the connecting rod, a torsion spring enabling actuation and return of the raising device.

30. The protection system according to claim 29, wherein the body is secured to the adjustable support by means of a tenon or an electromagnet.

31. The protection system according to claim 28, wherein the height-adjustable support includes a spring arranged in a telescopic tube having a base on either side, one of the bases being configured to bear on the body and the other base being configured to bear on a stake or a stand on which the protection system is positioned.

* * * * *